United States Patent
Yu et al.

(10) Patent No.: US 11,671,485 B2
(45) Date of Patent: Jun. 6, 2023

(54) DOWNLOAD CONTROL IN MULTI-SERVER COMMUNICATION SYSTEM

(71) Applicant: Dolby Laboratories Licensing Corporation, San Francisco, CA (US)

(72) Inventors: Mingchao Yu, Sydney (AU); Oliver O'Neill, Chapman (AU); Thomas Franklin Antioch, Chatswood (AU); Vahid Naghshin, Parramatta (AU); Jason Michael Cloud, Clayton, CA (US); Mark Craig Reed, Gordon (AU); Jeffrey Riedmiller, Novato, CA (US); Elliot Osborne, Neutral Bay (AU)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 35 days.

(21) Appl. No.: 17/436,480

(22) PCT Filed: Mar. 4, 2020

(86) PCT No.: PCT/US2020/020990
§ 371 (c)(1),
(2) Date: Sep. 3, 2021

(87) PCT Pub. No.: WO2020/180988
PCT Pub. Date: Sep. 10, 2020

(65) Prior Publication Data
US 2022/0201068 A1    Jun. 23, 2022

Related U.S. Application Data

(60) Provisional application No. 62/984,484, filed on Mar. 3, 2020, provisional application No. 62/814,697, filed on Mar. 6, 2019.

(51) Int. Cl.
*G06F 15/173* (2006.01)
*H04L 67/101* (2022.01)
*H04L 43/08* (2022.01)

(52) U.S. Cl.
CPC ............ *H04L 67/101* (2013.01); *H04L 43/08* (2013.01)

(58) Field of Classification Search
None
See application file for complete search history.

(56) References Cited

U.S. PATENT DOCUMENTS 7,461,319 B2    12/2008   Hanam
8,015,491 B2     9/2011   Shaver
(Continued)

FOREIGN PATENT DOCUMENTS

JP    2004072686 A    3/2004
JP    2008502061 A    1/2008
(Continued)

OTHER PUBLICATIONS

Clarke, Dwaine, et al "Software techniques for implementing dynamic network-aware energy-efficient download managers" published in Aug. 2017, https://link.springer.com/chapter/10.1007/978-3-319-65515-4_20.
(Continued)

*Primary Examiner* — Phuoc H Nguyen

(57) ABSTRACT

Apparatuses and methods for data traffic management in multi-source content delivery are described. The apparatus includes a downloader and a controller. The downloader is coupled to servers via communication links. The controller is configured to determine initial download requests for the servers based on predetermined information about a quality of the links. The controller is also configured to send the initial download requests to the servers with the downloader.
(Continued)

The controller is further configured to update the information about the quality of the communication links after the downloader receives data associated with a data file from the servers via the communication links. The controller is also configured to determine subsequent download requests for the servers based on the updated information about the quality of the communication links. The controller of further configured to send the subsequent download requests to the servers via the downloader. Rate adaptation is also proposed for each server, and download termination requests are transmitted to the servers when the download is almost complete at the apparatus.

17 Claims, 10 Drawing Sheets

(56) References Cited

U.S. PATENT DOCUMENTS

| | | |
|---|---|---|
| 8,589,565 B2 | 11/2013 | Scheibel |
| 8,719,381 B2 | 5/2014 | Scharber |
| 8,732,329 B2 | 5/2014 | Bennett |
| 9,118,637 B2 | 8/2015 | Winters |
| 9,247,277 B2 | 1/2016 | Watson |
| 9,614,907 B2 | 4/2017 | Yerkes |
| 9,745,154 B1 | 8/2017 | Lawrence |
| 2003/0097442 A1* | 5/2003 | Farhat .............. H04L 12/5692 709/224 |
| 2010/0011093 A1 | 1/2010 | Gordon |
| 2010/0057884 A1 | 3/2010 | Brownell |
| 2012/0143986 A1 | 6/2012 | Robinson |
| 2016/0337799 A1* | 11/2016 | Johnson .............. H04W 12/069 |
| 2017/0105045 A1* | 4/2017 | Strasman ............ H04L 41/5067 |
| 2019/0327510 A1* | 10/2019 | Kalagi ............ H04N 21/44209 |

FOREIGN PATENT DOCUMENTS

| | | |
|---|---|---|
| JP | 2009164862 A | 7/2009 |
| JP | 2013004995 A | 1/2013 |
| JP | 2015104075 A | 6/2015 |

OTHER PUBLICATIONS

Fujie, T. et al. "Multi-Server Content Distribution Scheme Using Erasure Codes" Proc. of the 29th Annual IEEE International Conference on Local Computer Networks, Nov. 16, 2004, pp. 415-416.

Park, Ju-Won, et al. "TCP-ROME: A Transport-Layer Parallel Streaming Protocol for Real-Time Online Multimedia Environments" Journal of Communications and Networks, vol. 13, No. 3, Jun. 2011, pp. 277-285.

Zhou, C. et al. "A Control-Theoretic Approach to Rate Adaption for DASH Over Multiple Content Distribution Servers", IEEE Transactions on Circuits and Systems for Video Technology, vol. 24, No. 4, Apr. 2014, pp. 681-694.

* cited by examiner

DOWNLOAD CONTROL IN MULTI-SERVER COMMUNICATION SYSTEM

CROSS REFERENCE TO RELATED APPLICATIONS

This application claims priority to U.S. Provisional Application No. 62/814,697, filed Mar. 6, 2019 and U.S. Provisional Application No. 62/984,484, filed Mar. 3, 2020, each of which is incorporated by reference in its entirety.

FIELD

This application relates generally to multi-source content delivery and, in particular, to excess data traffic reduction during multi-source content delivery.

BACKGROUND

Redundancy code partitions a data file into K equal-length original symbols and generates N>K coded symbols, each being a mixture (e.g., a linear combination) of the original symbols. Redundancy code allows the decoding of the K original symbols (and thus the recovery of a data file) using any K+δ coded symbols, where δ≥0 is a small integer. Some example redundancy codes include Reed-Solomon code, low-density parity check code, fountain code, and network code.

SUMMARY OF THE DESCRIPTION

Various aspects of the present disclosure relate to circuits, systems, and methods for managing excess data traffic in a multi-source content delivery system.

The present disclosure provides an apparatus that includes, in one implementation, a downloader and a controller. The downloader is coupled to a plurality of servers via a plurality of communication links. The controller is configured to determine initial download requests for the plurality of servers based on predetermined information about a quality of the plurality of communication links. The controller is also configured to send the initial download requests to the plurality of servers with the downloader. The controller is further configured to update the information about the quality of the plurality of communication links after the downloader receives data associated with a data file from the plurality of servers via the plurality of communication links. The controller is also configured to determine subsequent download requests for the plurality of servers based on the updated information about the quality of the plurality of communication links. The controller is further configured to send the subsequent download requests to the plurality of servers via the downloader.

The present disclosure also provides a method that includes, in one implementation, determining initial download requests for a plurality of servers based on predetermined information about a quality of a plurality of communication links coupling the plurality of servers to a downloader. The method also includes sending the initial download requests to the plurality of servers with the downloader. The method further includes receiving data associated with a data file at the downloader from the plurality of servers via the plurality of communication links. The method also includes updating the information about the quality of the plurality of communication links after the downloader receives the data from the plurality of servers via the plurality of communication links. The method further includes determining subsequent download requests for the plurality of servers based on the updated information about the quality of the plurality of communication links. The method also includes sending the subsequent download requests to the plurality of servers with the downloader.

The present disclosure also provides a non-transitory computer-readable medium storing instructions that, when executed by a processor of a computer, cause the computer to perform operations including, in one implementation, determining initial download requests for a plurality of servers based on predetermined information about a quality of a plurality of communication links coupling the plurality of servers to a downloader. The operations also include sending the initial download requests to the plurality of servers with the downloader. The operations further including receiving data associated with a data file at the downloader from the plurality of servers via the plurality of communication links. The operations also include updating the information about the quality of the plurality of communication links after the downloader receives the data from the plurality of servers via the plurality of communication link. The operations further include determining subsequent download requests for the plurality of servers based on the updated information about the quality of the plurality of communication links. The operations also include sending the subsequent download requests to the plurality of servers with the downloader.

In this manner, various aspects of the present disclosure provide for the reduction of excess data traffic, and effect improvements in at least the technical fields of multi-source content delivery.

BRIEF DESCRIPTION OF DRAWINGS

The present disclosure is illustrated by way of example, and not by way of limitation, in the figures of the accompanying drawings and in which reference numerals refer to similar element and in which.

DETAILED DESCRIPTION

Redundancy-coded multi-source content delivery systems include multiple servers and one receiver. Each server stores a different set of coded symbols of the same data file. The system enables the receiver to enjoy the aggregated bandwidth of all the server-receiver links because all the servers stream coded symbols to the receiver, and the receiver terminates all the streams once it has downloaded sufficient coded symbols from all servers for decoding. Using this approach, every link is fully utilized throughout the course of the download, which maximizes the throughput. However, this download strategy may generate excess traffic across the servers that is significantly more than the K+δ coded symbols requested by the receiver. One exemplary cause is network latency. Once the servers have transmitted K+δ coded symbols, the receiver will finish the reception of these coded symbols after a delay of one single trip time and then send a termination request. This termination request will be received by the servers after another delay of single trip time. This results in a total of one round trip time delay between when enough data has been transmitted for the receiver to decode and the reception of the termination request. During this period, each server will continue to stream coded symbols that are redundant and can be labelled as excess data or overhead. These redundant coded symbols exist in every link and may also exist in the servers' and receiver's lower layer communication buffers under certain implementations. These redundant coded symbols may increase server egress (and thus cost), reduce the network bandwidth available for other network flows, and may cause head-of-line blockages for delivery of subsequent data files.

Figure 1:
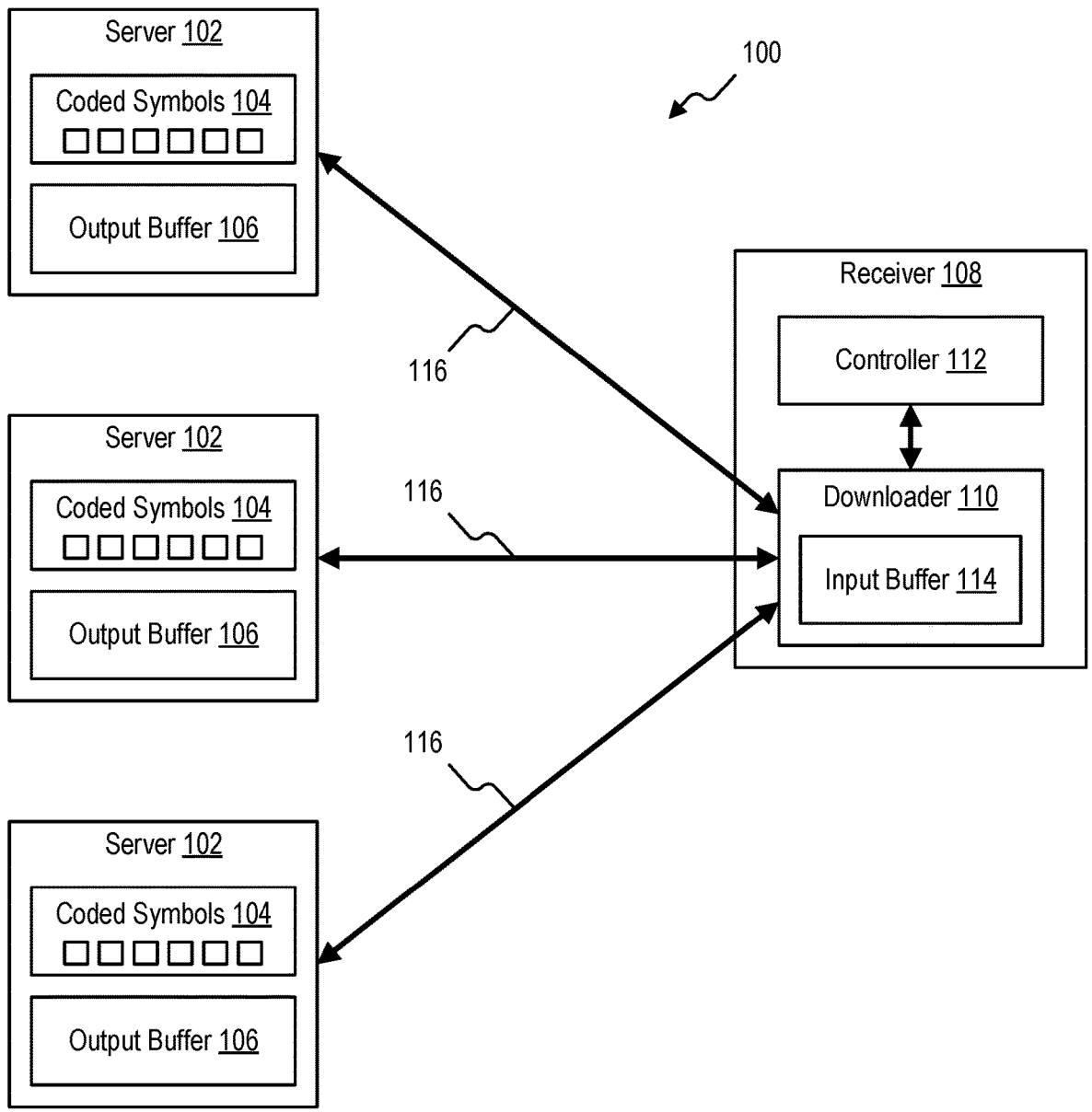
FIG. 1 illustrates a block diagram of an exemplary system for multi-source content delivery, according to an implementation of the present disclosure.

FIG. 1 is a block diagram of an example of a system 100 for multi-source content delivery according to an implementation of the present disclosure. The system 100 illustrated in FIG. 1 includes a plurality of servers 102 that each store coded symbols 104 of the same data file. In some implementations, each of the plurality of server 102 stores a different set of coded symbols 104 of the same data file. In some implementations, each of the plurality of servers 102 store a complete identical set of coded symbols 104 of the same data file. The plurality of servers 102, which will be described in more detail below, each include an output buffer 106 and are configured to, among other things, send or stream coded symbols 104 to other components of the system 100, as well as components external to the system 100. In practice, the plurality of servers 102 may include additional components such as one or more electronic processors, memories, interfaces, displays, speakers, power supplies, and the like. For ease of explanation, these additional components are not illustrated here. The system 100 illustrated in FIG. 1 includes three servers. In practice, the system 100 may include fewer than three servers or more than three servers.

The system 100 illustrated in FIG. 1 also includes a receiver 108 (for example, an audio/video receiver). The receiver 108, which will be described in more detail below, includes a downloader 110 and a controller 112. In practice, the receiver 108 may include additional components such as one or more displays, speakers, power supplies, memories, and the like. For ease of explanation, these additional components are not illustrated here.

The downloader 110 illustrated in FIG. 1 includes an input buffer 114 and is communicably coupled to the plurality of servers 102 via a plurality of communication links 116. The plurality of communication links 116 include wired links, wireless links, or a combination thereof. As described above, each of the plurality of servers 102 store a different set of coded symbols 104 of a data file. To decode the data file, the downloader 110 is configured to send download requests to the plurality of servers 102, and subsequently receive the coded symbols 104 stored in each of the plurality of servers 102. The downloader 110 receives the coded symbols 104 from the plurality of servers 102 with the input buffer 114 via the plurality of communication links 116. After receiving a sufficient quantity of coded symbols 104 to decode the data file, the downloader 110 is configured to send download termination requests to the plurality of servers 102 to terminate the data transfer therefrom.

Figure 2:
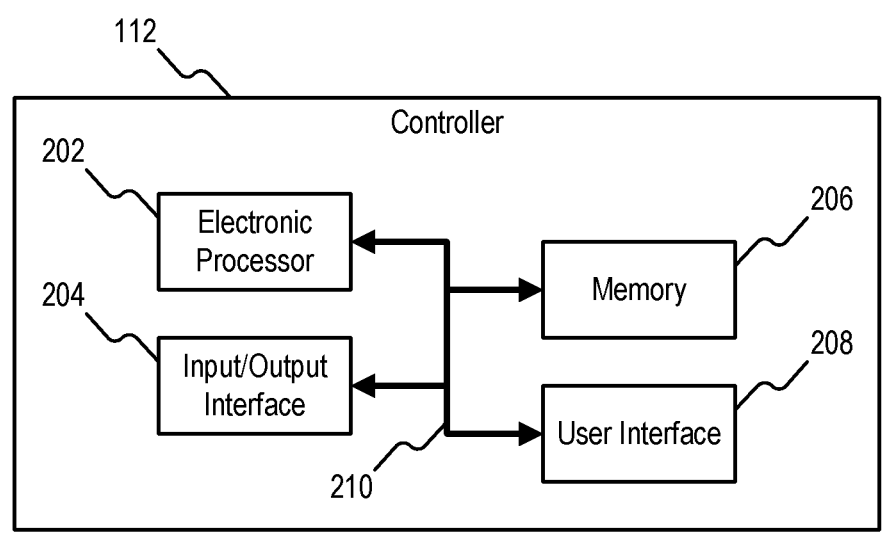
FIG. 2 illustrates a block diagram of an exemplary controller, according to an implementation of the present disclosure.

The controller 112 is communicably coupled to the downloader 110 and is configured to, among other things, determine which data the downloader 110 should request from each of the plurality of servers 102, as will be described in more detail below. FIG. 2 is a block diagram of one example of the controller 112 according to an implementation of the present disclosure. The controller 112 illustrated in FIG. 2 includes an electronic processor 202 (for example, one or more microprocessors, application-specific integrated circuits (ASICs), systems-on-a-chip (SoCs), or other electronic controllers), memory 204, an input/output interface 206, a user interface 208, and a bus 210. In practice, the controller 112 may include additional components such as communication circuitry, one or more sensors, one or more power supplies, and the like. For ease of explanation, these additional components are not illustrated here.

The bus 210 connects various components of the controller 112 including, for example, the memory 204 to the electronic processor 202. The memory 204, for example, includes read only memory (ROM), random access memory (RAM), an electrically erasable programmable read-only memory (EEPROM), other non-transitory computer-readable media, or a combination thereof. The electronic processor 202 is configured to retrieve program instructions and data from the memory 204 and execute, among other things, instructions to perform the methods described herein. In some implementations, the memory 204 is included in the electronic processor 202.

The input/output interface 206 includes routines for transferring information between components within the controller 112 and other components of the system 100, as well as components external to the system 100. The input/output interface 206 is configured to transmit and receive signals via one or more wired couplings (e.g., wires, optical fiber, and the like), wirelessly, or a combination thereof. Signals may include, for example, download requests, termination requests, coded symbols, or a combination thereof.

The user interface 208 includes, for example, a computer having a display and input devices, a touch-screen display, a plurality of knobs, dials, switches, buttons, faders, and the like. In some implementations, the user interface 208 includes a touch-sensitive interface (e.g., a touch-screen display) that displays visual output generated by software applications executed by the electronic processor 202. Visual output includes, for example, graphical indicators, lights, colors, text, images, graphical user interfaces (GUIs), combinations of the foregoing, and the like. The touch-sensitive interface also receives user input using detected physical contact (e.g., detected capacitance or resistance). In some implementations, the user interface 208 is separated from the controller 112, the receiver 108, or from the system 100.

Progressive Partial Download Requests

In some implementations, the downloader 110 downloads a data file progressively by sequentially sending one or more partial download requests to each of the plurality of servers 102. The controller 112 determines when and how much data to request from each of the plurality of servers 102. Once the file becomes decodable, the controller 112 instructs the downloader 110 to transmit download termination requests to each of the plurality of servers 102. In some implementations, the partial download requests fall into two phases: an initial phase and a refill phase.

During the initial phase, one initial download request is made to each of the plurality of servers 102. The total number of coded symbols K' requested across all of the plurality of servers 102 is less than K(1+p), where K is the quantity of useful coded symbols being requested to decode the file, and p≥0 is the allowance on excess data. In some implantations, the value of K' may depend on the variation of each communication link's bandwidth, latency, or both. In general, the more stable the plurality of communication links 116, the closer K' is to K(1+p).

During the refill phase, additional download requests (for example, subsequent download requests) are sent to some or all of the plurality of servers 102 to: (i) keep the respective communication link 116 between each server 102 and the downloader 110 fully utilized; and (ii) adjust the total quantity of data requested from the server 102 to minimize excess data.

Figure 3A:
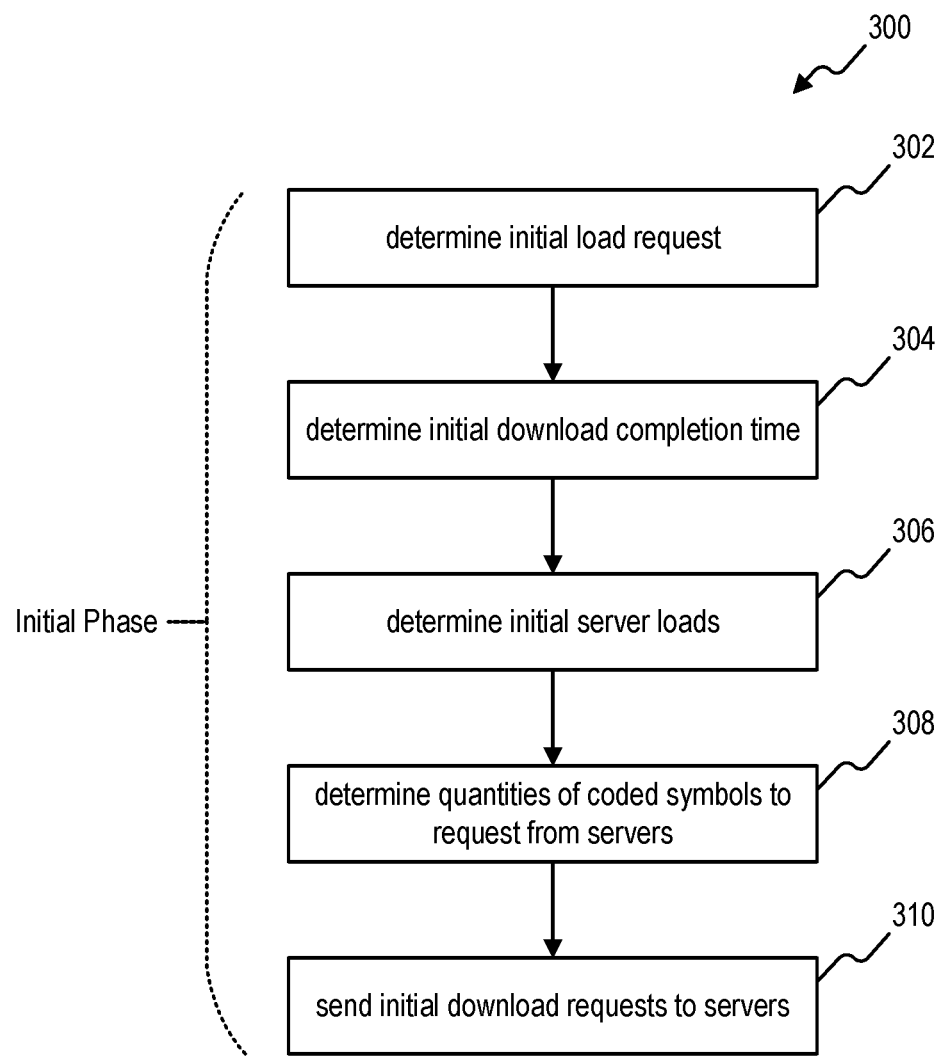
FIGS. 3A and 3B illustrate a flow diagram of an exemplary method for data traffic management in multi-source content delivery with progressive partial download requests, according to an implementation of the present disclosure.
Figure 3B:
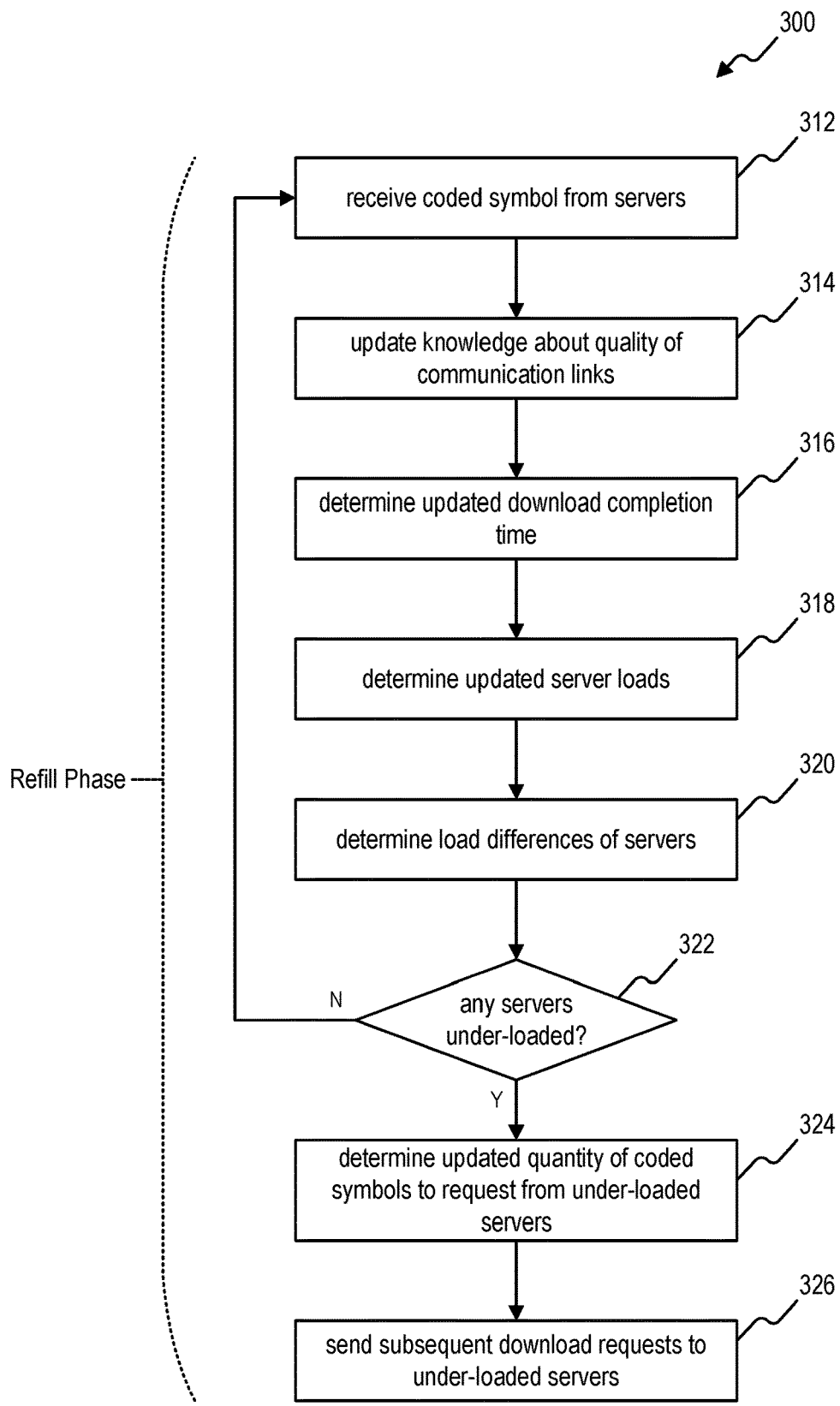

FIGS. 3A and 3B illustrate a flow diagram of an example of a method 300 for data traffic management in multi-source content delivery with progressive partial download requests according to an implementation of the present disclosure. The steps of method 300 illustrated in FIG. 3A are one example of the initial phase described above. At block 302, an initial load request K' is determined (e.g., by the controller 112). The initial load request K' is the total quantity of coded symbols 104 to be requested in the initial download requests. In some implementations, the initial request load K' is determined based on the stability of the communication links 116. For example, the initial load request K' may be determined based on the normalized standard deviation of the bandwidths of the communication links 116. The normalized bandwidth standard deviation is the ratio between the standard deviation and the mean of the bandwidth of a communication link according to prior information (e.g., observations). The normalized bandwidth standard deviations of all the communication links 116 are averaged to yield a variance factor v which is bounded by a non-negative fractional number c, such as 0.5. The variance factor v is given by the following:

$$v = \min\left(c, \frac{1}{N}\sum_{i=1}^{N} \sigma_i / w_i\right)$$

where N is the total quantity of communication links 116, $\sigma_i$ is an observed standard deviation of communication link i, and $w_i$ is the average bandwidth of communication link i. In some implementations, the bandwidth $w_i$ of communication link i is determined based on previously-observed performances of communication link i (e.g., by averaging previously-observed performances of communication link i).

The initial load request K' is given by the following:

$$K'=(1-v)*K*(1+p)$$

where v is the variance factor described above, K is the number of useful symbols requested to decode the data file, and p is an allowance of excess data. In some implementations, the allowance of excess data p is determined based on system-level requirements for the system 100. In some implementations, the allowance of excess data p is determined based at least in part on the specific components of the system 100.

At block 304, an initial download completion time T is determined (e.g., by the controller 112). In some implementations, the controller 112 is configured to determine the initial download completion time T based the total quantity of data provided by each of the plurality of servers 102 when a total of K' coded symbols 104 are received and each of the plurality of communication links 116 are fully utilized. For example, the initial download completion time T may be determined by solving the following equation for T:

$$\sum_{i=1}^{N} \max(T-d_i,0)*w_i=s*K'$$

where N is the total quantity of communication links 116, $d_i$ is the round trip time of communication link i, $w_i$ is the average bandwidth of communication link i, s is the size of a coded symbol, and K' is the quantity of coded symbols 104 still being requested to decode the data file (i.e., the initial load request).

At block 306, initial server loads $L_i$ for each of the plurality of servers 102 are determined (e.g., by the controller 112). In some implementations, the controller 112 is configured to determine the initial server load $L_i$ of server i based in part on the initial download completion time T. For example, when the initial download completion time T is greater than the round trip time $d_i$ of communication link i, the initial server load $L_i$ of server i may be given by the following:

$$L_i=(T-d_i)*w_i*(1+p)$$

where $d_i$ is the round trip time of communication link i, $w_i$ is the average bandwidth of communication link i, and p is an allowance of excess data.

In situations in which server i is allocated with zero load (e.g., due to a high round trip time, small bandwidth, or both), the controller 112 is configured to allocate an initial server load $L_i$ to server i that is smaller than the initial load request K'. For example, when the initial download completion time T is less than or equal to the round trip time $d_i$ of communication link i, the initial server load $L_i$ of server i may be given by the following:

$$L_i=c*K'*(p/N)$$

where c is a non-negative fractional number (e.g., 0.5), K is the number of useful symbols being requested to decode the data file, p is an allowance of excess data, and N is the total quantity of communication links 116.

At block 308, quantities $n_i$ of coded symbols 104 to initially request from each of the plurality of servers 102 are determined (e.g., by the controller 112). In some implementations, the controller 112 is configured to determine the quantities $n_i$ of coded symbols 104 by rounding the initial server load $L_i$ of each of the plurality of servers 102 by the size s of a coded symbol 104. For example, the quantity $n_i$ of coded symbols 104 to request from server i may be given by the following:

$$n_i=\text{ceil}(L_i/s)$$

where $L_i$ is initial server load of server i, and s is the size of a symbol. As used herein, ceil(x) is a ceiling function which returns the smallest integer that is greater than x.

At block 310, initial download requests are sent to each of the plurality of servers 102 (e.g., by the downloader 110). For example, the downloader 110 sends signals including the initial download requests over each of the plurality of communication links 116 to each of the plurality of servers 102. In some implementations, each of the initial downloads requests includes, among other things, an identifier of the data file to download and a quantity $n_i$ of coded symbols 104 to request from a server 102. For example, the downloader 110 sends an initial download request to server i, via communication link i, that includes an identifier of the data file to download and a quantity $n_i$ of coded symbols 104 to request from server i.

In some implementations, the initial load request K' is unevenly allocated to the plurality of servers 102. For example, servers 102 with higher performance are allocated more of the initial load request K' than servers 102 with lower performance. As described above in block 302 of method 300, the initial load request K' is allocated based on the round trip times and the bandwidths of each of the plurality of communication links 116. In some implementations, the initial load request K' is evenly allocated across all of the plurality of servers 102.

Turning to FIG. 3B, the steps of method 300 illustrated in FIG. 3B are one example of the refill phase described above. At block 312, a coded symbol 104 is received from one of the plurality of servers 102 over one of the plurality of communication links 116 (e.g., by the downloader 110). For example, the downloader 110 receives a coded data packet containing one or more coded symbols 104 from one of the plurality of servers 102. At block 314, updated information about the quality of the plurality of communication links 116 is determined (e.g., by the controller 112). In some implementations, the controller 112 determines updated bandwidths and instantaneous latencies $\tau_i$ for each of the plurality of communication links 116. For example, the controller 112 determines an updated bandwidth $w_i$ of communication link i based on download speeds measured during receipt of the most recently downloaded coded data packet. Further, the controller 112 determines an instantaneous latency $\tau_i$ of communication link i based on whether or not the downloader 110 has received any data over communication link i. For example, the controller 112 determines an instantaneous latency $\tau_i$ of zero for communication link i when the downloader 110 has received any data over communication link i. If the downloader 110 has not received any data over communication link i, the round trip time $d_i$ of communication link i is higher than the time t that has elapsed since the initial download requests were sent and the controller 112 determines the instantaneous latency $\tau_i$ of communication link i as the difference between $d_i$ and t.

At block 316, an updated download completion time T' is determined (e.g., by the controller 112). In some implementations, the controller 112 is configured to determine the updated download completion time T' based on the updated information about the quality of the plurality of communication links 116 and the total quantity K" of coded symbols 104 still being requested to decode the data file. For example, the updated download completion time T' may be determined by solving the following equation for T':

$$\Sigma_{i=1}^{N} \max(T'-\tau_i, 0) * w_i = s * K''$$

where N is the total quantity of communication links 116, $\tau_i$ is the instantaneous latency of communication link i, $w_i$ is the updated bandwidth of communication link i, s is the size of a symbol, and K" is the quantity of coded symbols 104 still being requested to decode the data file.

At block 318, updated server loads $L_i$ of each of the plurality of servers 102 are determined (e.g., by the controller 112). In some implementations, the controller 112 is configured to determine an updated server load $L_i$ of server i based on the updated download completion time T' and the updated bandwidth $w_i$ of communication link i. For example, the updated server load $L_i$ of server i is given by the following:

$$L_i = T' * w_i$$

where T' is the updated download completion time and $w_i$ is the updated bandwidth of communication link i.

In some implementations, a subsequent download request (also known as a refill request) is sent to a server 102 only when the updated server load of the server 102 is higher than its current load that has not been received. Thus, at block 320, load differences $\delta_i$ of each of the plurality of servers 102 are determined (e.g., by the controller 112). For example, the load difference $\delta_i$ of server i is the difference between the updated server load $L_i$ of server i and the current undelivered load $L_i'$ of server i.

At block 322, the controller 112 determines whether any of the plurality of servers 102 are under-loaded. For example, the controller 112 determines that server i is under-loaded when the load difference $\delta_i$ of server i is greater than zero. Further, the controller 112 determines that server i has enough load when the load difference $\delta_i$ of server i is less than or equal to zero. When none of the plurality of servers 102 are under-loaded, no subsequent download requests are sent to the plurality of server 102 and the method 300 returns to block 312 to receive additional coded symbols 104 from the plurality of servers 102. Alternatively, when any of the plurality of servers 102 are under-loaded, updated quantities $n_i$ of coded symbols 104 to request from each of the under-loaded servers are determined at block 324 (e.g., by the controller 112). For example, the updated quantity $n_i$ of coded symbols 104 to request from server i may be given by the following:

$$n_i = \operatorname{ceil}\left(\frac{\min(\delta_i, w_i * d_i)}{s}\right)$$

where $\delta_i$ is load difference of server i, $w_i$ is the updated bandwidth of communication link i, $d_i$ is the round trip time of communication link i, and s is the size of a symbol.

At block 326, subsequent download requests are sent to the under-loaded servers 102 (e.g., by the downloader 110). In some implementations, each of the subsequent downloads requests includes, among other things, an updated quantity $n_i$ of coded symbols 104 to request from an under-loaded server 102. For example, the downloader 110 sends a subsequent download request to server i, via communication link i, that includes an updated quantity $n_i$ of coded symbols 104 to request from server i. In some implementations, after sending the subsequent download requests, the method 300 returns to block 312 to receive additional coded symbols 104 from the plurality of servers 102.

Soft Download Termination Requests

In some implementations, the downloader 110 is configured to send download termination requests to each of the plurality of servers 102 at specific times so that each of the plurality of servers 102 receive a download termination request immediately after that server 102 loads the last useful symbol to its output buffer 106. Each of the plurality of servers 102 receives and executes the download termination request immediately after the server 102 has loaded the last useful symbol to its output buffer 106. In this manner, the quantity of excess data sent by each of the plurality of servers 102 is minimized because each of the plurality of servers 102 sends few or no excess symbols to the downloader 110.

Figure 4:
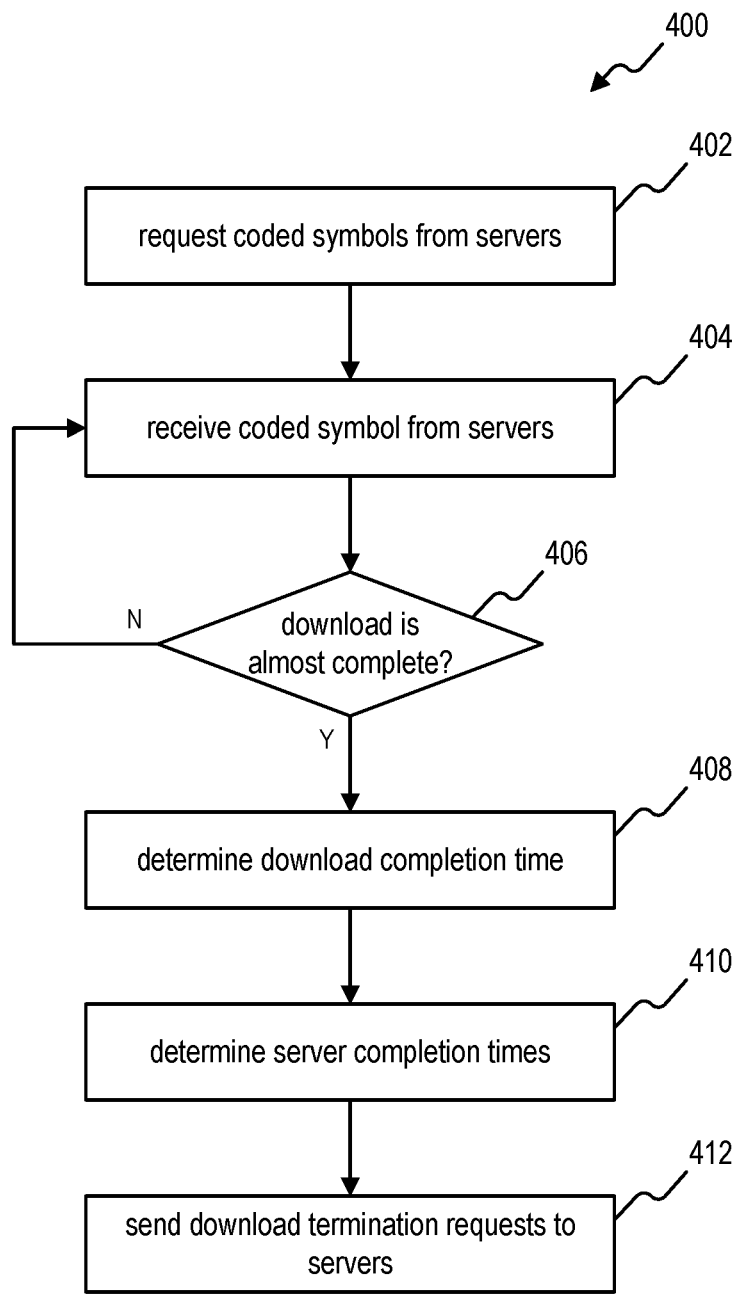
FIG. 4 illustrates a flow diagram of an exemplary method for data traffic management in multi-source content delivery with soft download termination requests, according to an implementation of the present disclosure.

FIG. 4 illustrates a flow diagram of an example of a method 400 for data traffic management in multi-source content delivery with soft download termination requests according to an implementation of the present disclosure. At block 402, coded symbols are requested from each of the plurality of servers 102 (e.g., by the downloader 110). In some implementations, the coded symbols are requested from the plurality of servers 102 using any portion (or any combination of portions) of the method 300 described above. At block 404, a coded symbol 104 is received (e.g., by the downloader 110) from one of the plurality of servers 102 over one of the plurality of communication links 116. For example, the downloader 110 receives a coded data packet containing one or more coded symbols 104 from one of the plurality of servers 102. At block 406, the controller 112 determines whether the download is almost complete. In some implementations, the controller 112 determines that the download is almost complete when the downloader 110 has received a majority of the coded symbols 104 from the plurality of servers 102. For example, the controller 112 determines that the download is almost complete when the downloader 110 has received a quantity of coded symbols 104 that is greater than a final phase threshold Th'. The final phase threshold Th' may be given by the following:

$$Th'=sK-\Sigma_{i=1}^{N}w_i*d_i$$

where s is the size of a coded symbol, K is the quantity of useful coded symbols being requested to decode the data file, N is the total quantity of communication links 116, $w_i$ is the average bandwidth of communication link i, and $d_i$ is the round trip time of communication link i. When the download is not almost complete, the method 400 returns to block 404 to receive additional coded symbols 104 from the plurality of servers 102.

Alternatively, when download is almost complete, a download completion time T is determined at block 408 (e.g., by the controller 112). For example, the download completion time T may be determined by solving the following equation for T:

$$\Sigma_{i=1}^{N}\max(T-d_i,0)*w_i=s*K$$

where N is the total quantity of communication links 116, $d_i$ is the round trip time of communication link i, $w_i$ is the average bandwidth of communication link i, s is the size of a coded symbol, and K is the quantity of useful symbols being requested to decode the data file.

At block 410, server completion times $U_i$ when each of the plurality of servers 102 load the last useful coded symbol 104 to their output buffer 106 are determined (e.g., by the controller 112). In some implementations, the controller 112 determines the server completion times $U_i$ based on information about the quality of the plurality of communication links 116 and the sizes of the servers' output buffers 106. For example, the server completion time $U_i$ of server i is given by the following:

$$U_i = \max\left(d_i/2, T - \frac{b_i}{w_i} - \frac{d_i}{2}\right)$$

where $d_i$ is the round trip time of communication link i, T is the download completion time, $b_i$ is the size of the output buffer 106 of server i, and $w_i$ is the bandwidth of communication link i.

At block 412, download termination requests are sent to the plurality of servers 102 (e.g., by the downloader 110). Each of the download termination requests is sent to a specific server at a set period of time prior to the specific server's server completion time. For example, a download termination request is sent to server i at time $U_i-(d_i/2)$. In some implementations, a specific subset of the plurality of servers 102 are not sent download termination requests until after the data file is downloadable.

Download Rate Adaption

Figure 5:
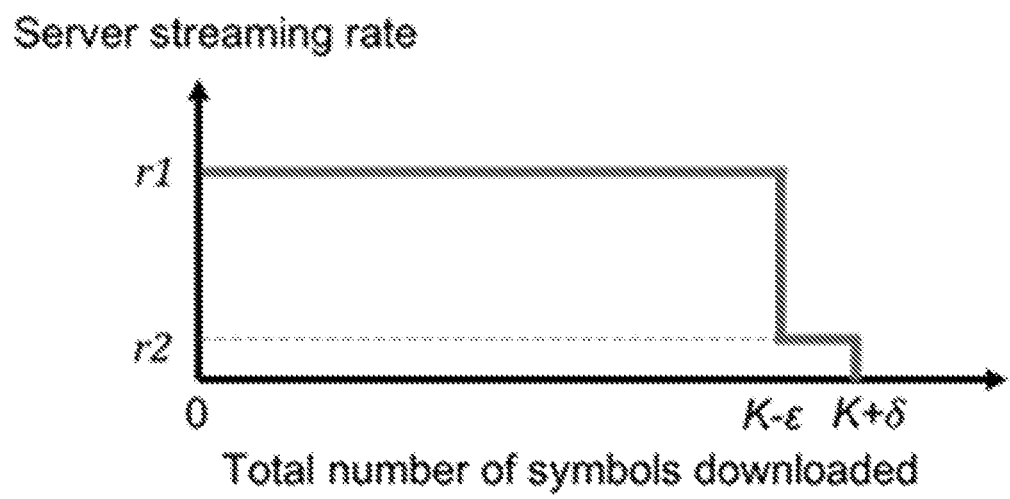
FIG. 5 illustrates an exemplary server streaming rate generated by download rate adaption, according to an implementation of the present disclosure.

In some implementations, while downloading a data file, the controller 112 adapts the streaming rate of each of the plurality of servers 102 to: (i) maintain a maximum streaming rate until the data file is almost decodable, and (ii) use a reduced streaming rate to download the last few coded symbols. For example, as illustrated in FIG. 5, the server streaming rate is set to its maximum rate $r_1$ until K–ε coded symbols are downloaded in total, where K is the quantity of useful coded symbols being requested to decode the data file and ε is a small positive integer. The server streaming rate illustrated in FIG. 5 is reduced to a small rate $r_2$ until the data file is decodable. After this, the download is terminated.

In some implementations, the controller 112 adapts the streaming rates of the plurality of servers 102 by adapting the sizes of the output buffers 106 of the plurality of servers 102. For example, the controller 112 adapts the sizes of the output buffers 106 of the plurality of servers 102 through HTTP/2 session window size adaption. In general, increasing the size of the output buffer 106 of a server 102 increases the streaming rate and the bandwidth of the corresponding communication link 116.

Figure 6:
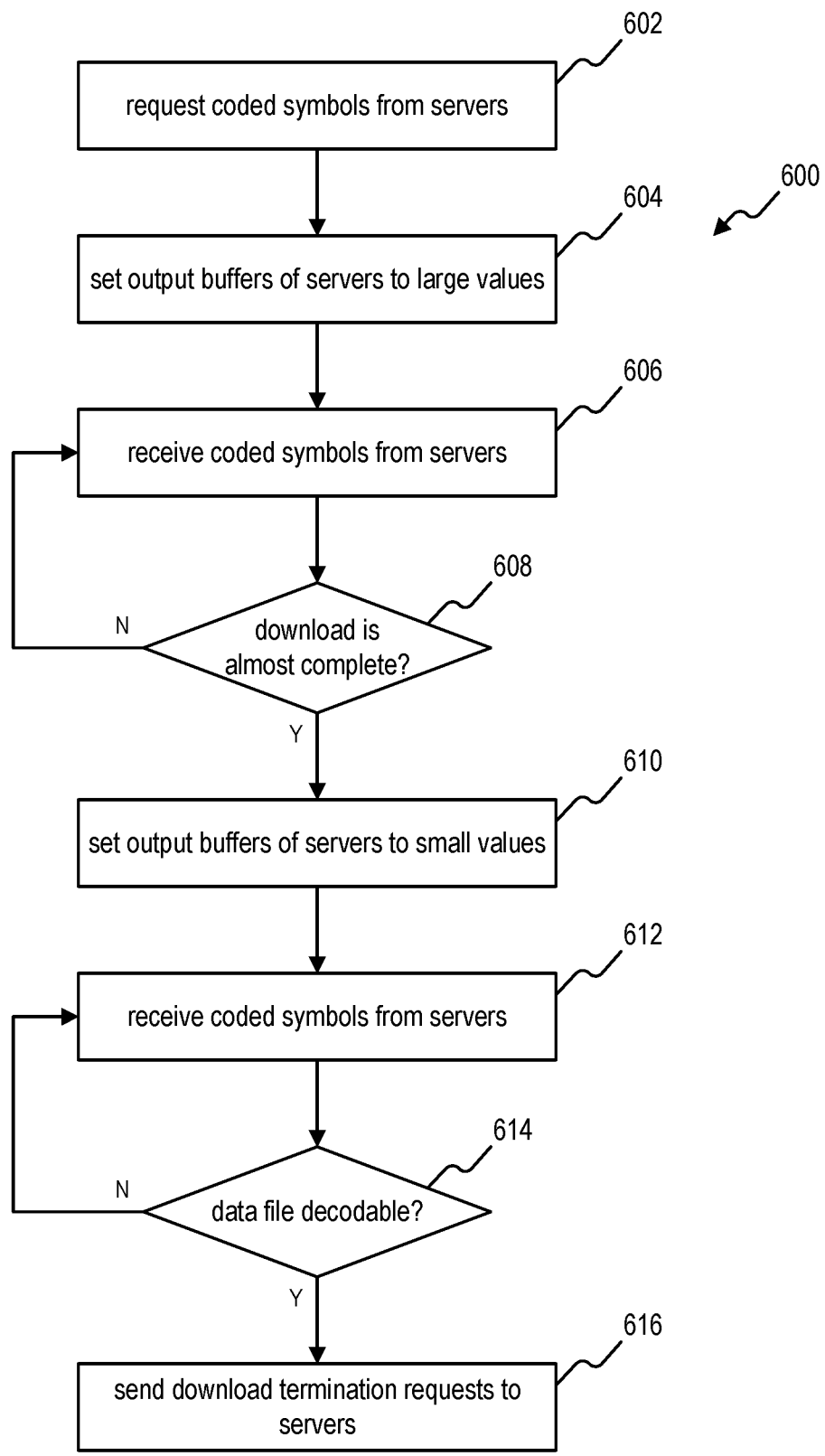
FIG. 6 illustrates a flow diagram of an exemplary method for data traffic management in multi-source content delivery with download rate adaption, according to an implementation of the present disclosure.

FIG. 6 illustrates a flow diagram of an example of a method 600 for data traffic management in multi-source content delivery with download rate adaption according to an implementation of the present disclosure. At block 602, coded symbols are requested from each of the plurality of servers 102 (e.g., by the downloader 110). In some implementations, the coded symbols are requested from the plurality of servers 102 using any portion (or any combination of portions) of the method 300 described above.

At block 604, the output buffers 106 of the plurality of servers 102 are set to large values (an example of a "first value"). For example, a large size value $L\_Buf_i$ for the output buffer 106 of server i is given by the following:

$$L\_Buf_i=w_i*d_i*p_i$$

where $w_i$ is the bandwidth of communication link i, and $d_i$ is the round trip time of communication link i, and $p_i$ is the smallest positive number that: (i) allows a streaming rate of server i to reach the bandwidth $w_i$ and (ii) is a multiple of the size s of the coded symbols 104.

At block 606, coded symbols 104 are received (e.g., by the downloader 110) from the plurality of servers 102 over the plurality of communication links 116. For example, the downloader 110 receives coded data packets containing coded symbols 104 from the plurality of servers 102. At block 608, the controller 112 determines whether the download is almost complete. In some implementations, the controller 112 determines that the download is almost complete when the downloader 110 has received a majority of the coded symbols 104 from the plurality of servers 102. For example, the controller 112 determines that the download is almost complete when the downloader 110 has received a total of K−ε coded symbols 104 from the plurality of servers 102 (an example of a "majority threshold"), where K is the quantity of useful coded symbols being requested to decode the data file and E is a small positive integer. When the download is not almost complete, the method 600 returns to block 604 to receive additional coded symbols from the plurality of servers 102.

Alternatively, when download is almost complete, the output buffers 106 of the plurality of servers 102 are set to small values (an example of a "second value"), at block 610. For example, a small size value $S\_Buf_i$ for the output buffer 106 of server i is given by the following:

$$S\_Buf_i = w_i * d_i * q_i$$

where $w_i$ is the bandwidth of communication link i, $d_i$ is the round trip time of communication link i, and $q_i$ is positive number that: (i) is smaller than $p_i$, and (ii) is a multiple of the size s of the coded symbols 104.

At block 612, additional coded symbols 104 are received (e.g., by the downloader 110) from the plurality of servers 102 over the plurality of communication links 116. At block 614, the controller 112 determines whether the data file is decodable. In some implementations, the data file is decodable when the downloader 110 has received a sufficient quantity of the coded symbols 104 being requested to decode the data file. For example, the controller 112 determines that the data file is decodable when the downloader 110 has received a total of K+δ coded symbols 104 from the plurality of servers 102, where K is the quantity of useful coded symbols being requested to decode the data file and δ is a small positive integer. When the data file is not decodable, the method 600 returns to block 612 to receive additional coded symbols from the plurality of servers 102. Alternatively, when the data file is decodable, download termination requests are sent to the plurality of servers 102 at block 616 (e.g., by the downloader 110).

Figure 7:
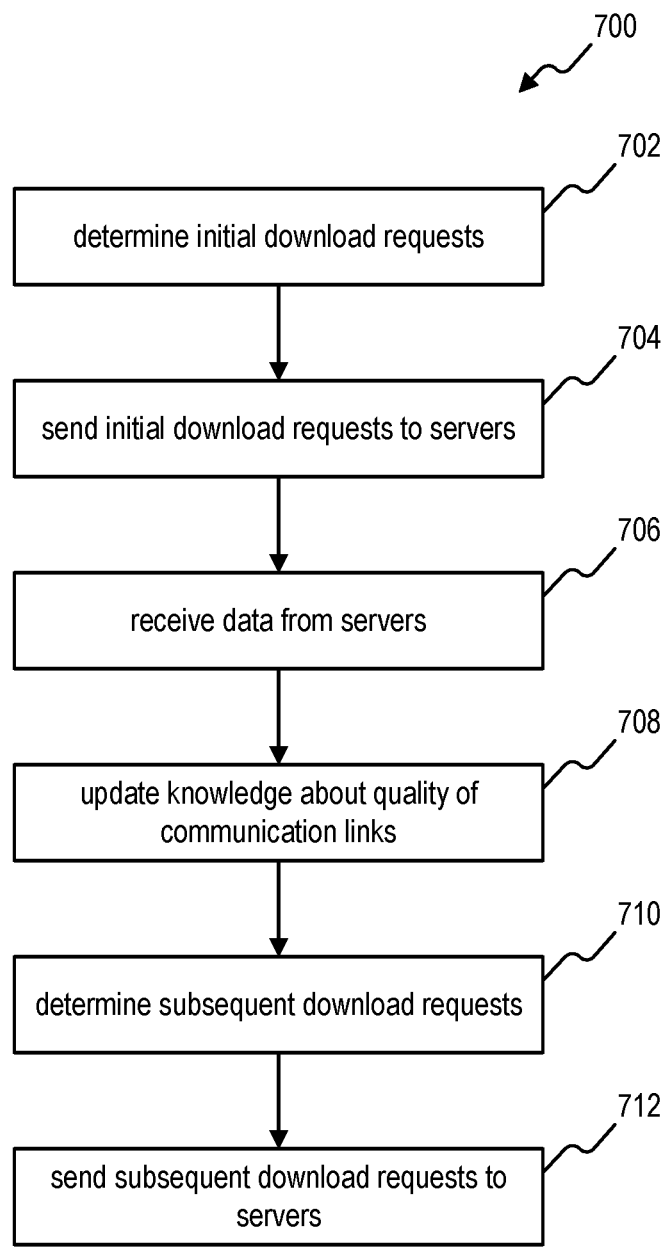
FIG. 7 illustrates a flow diagram of an exemplary method for data traffic management in multi-source content delivery, according to an implementation of the present disclosure.

FIG. 7 illustrates a flow diagram of an example of a method 700 for data traffic management in multi-source content delivery according to an implementation of the present disclosure. At block 702, initial download requests for the plurality of servers 102 are determined (e.g., by the controller 112). In some implementations, each of the initial download requests includes a request for a specific server to send a specific quantity (an example of a "first quantity") of data to the downloader 110. For example, as described above in relation to block 308 in FIG. 3A, each of the initial download requests may include a request for a specific server to send a specific quantity of the coded symbols 104 to the downloader 110. In some implementations, each of the initial download requests includes a request for a specific server to set the size of its output buffer 106 to a large value, for example, as described above in relation to block 604 in FIG. 6.

The initial download requests are determined based on predetermined information about the quality of the plurality of communication links 116 (e.g., bandwidth, latency, and packet loss rate). In some implementations, the initial download requests are determined based on server information (e.g., server location, cache status, and output buffer size). In some implementations, the initial download requests are determined based on information about the data file being downloaded (e.g., data file size and data file type). In some implementations, the initial download requests are determined based on the download performance of previously-downloaded data files. In some implementations, the initial download requests are determined based on the system budget (e.g., maximum acceptable amount of excess data).

At block 704, the initial download requests are sent to the plurality of servers 102 (e.g., by the downloader 110). For example, the downloader 110 sends signals including the initial download requests over each of the plurality of communication links 116 to each of the plurality of servers 102. At block 706, the receiver 108 receives data from the plurality of servers 102 (e.g., with the downloader 110). For example, the downloader 110 may receive coded symbols 104 from the plurality of servers 102.

At block 708, updated information about the quality of the plurality of communication links 116 is determined (e.g., by the controller 112). In some implementations, the controller 112 determines updated bandwidths and instantaneous latencies for each of the plurality of communication links 116, for example, as described above in relation to block 314 in FIG. 3B.

At block 710, subsequent download requests are determined (e.g., by the controller 112). In some implementations, each of the subsequent download requests includes a request for a specific server to send a specific quantity (an example of a "second quantity") of the data to the downloader 110. For example, as described above in relation to block 324 in FIG. 3B, each of the subsequent download requests may include a request for a specific server to send a specific quantity of the coded symbols 104 to the downloader 110. In some implementations, each of the subsequent download requests includes a download termination request for a specific server to stop sending data to the downloader 110. For example, as described above in relation to block 412 in FIG. 4, each of the subsequent download requests may include a request for a specific server to stop sending coded symbols 104 to the downloader 110. In some implementations, each of the subsequent download requests includes a request for a specific server to set the size of its output buffer 106 to a small value, for example, as described above in relation to block 610 in FIG. 6.

The subsequent download requests are determined based on updated information about the quality of the plurality of communication links 116 (e.g., bandwidth, latency, and packet loss rate). In some implementations, the subsequent download requests are determined based on server information (e.g., server location, cache status, and output buffer size). In some implementations, the subsequent download requests are determined based on information about the data file being downloaded (e.g., data file size and data file type). In some implementations, the subsequent download requests are determined based on the download performance of previously-downloaded data files and the current data file being downloaded. In some implementations, the subsequent download requests are determined based on the system budget (e.g., maximum acceptable amount of excess data).

At block 712, the subsequent download requests are sent to the plurality of servers 102 (e.g., by the downloader 110). For example, the downloader 110 sends signals including the subsequent download requests over each of the plurality of communication links 116 to each of the plurality of servers 102.

Machine Learning

In some implementations, machine-learning techniques are used to train and deploy the download process used by the controller 112 to make control decisions. Examples of control decisions include, but are not limited to: (i) which one of the aforementioned data traffic management processes should be used; (ii) what are the parameters for the chosen process; and (iii) a decision beyond the scope of the aforementioned processes. In some implementations, the training initialization defines the following four settings: (i) an input space; (ii) a learning process and model; (iii) an output space; and (iv) a reward/penalty function. With input space, each input is a set of system information, including (but not limited to) server information, network information, device information, download progress, and the like. The information is collected globally, regionally, locally, and/or on a per-user basis, and then the training data set and testing data set are created accordingly. One example of a learning algorithm and model is batched stochastic gradient descent using a convolutional neural network. The output space includes, for example, which servers 102 make download requests, how much data to request, when to make download requests, and when to terminate downloads. The reward/penalty function generates a higher reward for a higher ratio between throughput and excess data. The training process is iterative and each iteration may, for example, include: (i) a batch of training inputs being given to the model; (ii) for each sample input, the model determining an output (i.e., a control decision) based on a learning process; (iii) determining excess data and throughput performance of each output; (iv) determining a total reward/penalty; and (v) adjusting the model based on feedback from the reward/penalty. In some implementations, the performance of the model is tracked using a test data set, so that the training will stop when the model's performance become stable (i.e., the model is converged).

Figure 8:
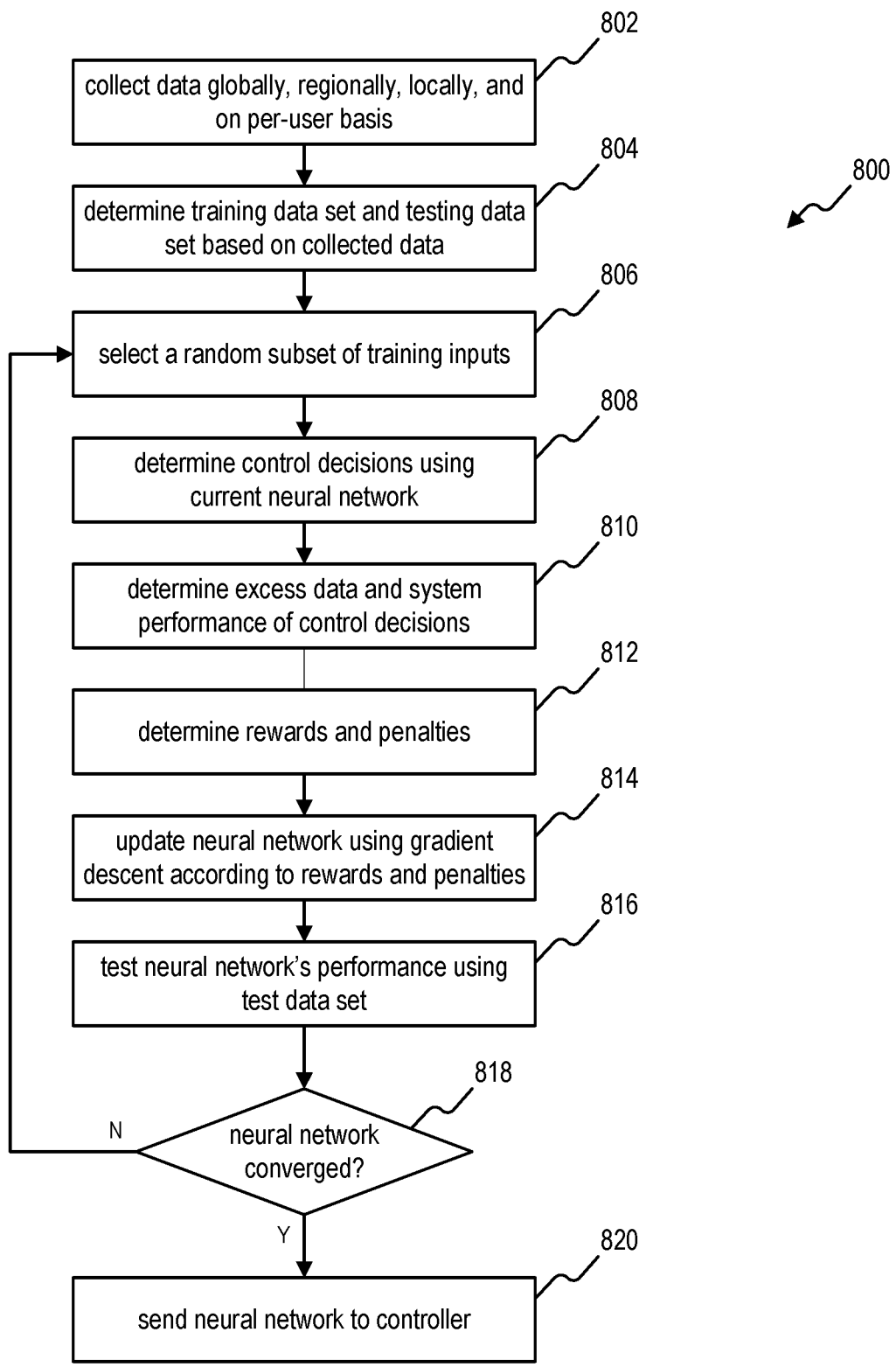
FIG. 8 illustrates a flow diagram of an exemplary training process for a neural network related to data traffic management in multi-source content delivery, according to an implementation of the present disclosure.

The training output is the model, which determines control decisions when provided with system information. The model can be either pre-trained using universal data samples and then distributed to the controller 112, be trained at the controller 112 using real-time data of the receiver 108, or be pre-trained and then evolved at the controller 112. FIG. 8 illustrates a flow diagram of an example of a training process 800 according to an implementation of the present disclosure. At block 802, data is collected globally, regionally, locally, and on a per-user basis. At block 804, a training data set and testing data set are determined based on the collected data. At block 806, a random subset of training inputs is selected. At block 808, control decisions are determined using a current neural network. At block 810, excess data and system performance of control decisions are determined. At block 812, rewards and penalties are determined. At block 814, the neural network is updated using gradient descent according to the rewards and penalties. At block 816 the neural network's performance is tested using the test data set. At block 818, it is determined if the neural network has converged. When the neural network has not converged, the training process 800 returns to block 806 to select a new random subset of training input. Alternatively, when the neural network has converged, the neural network is sent to the controller 112, at block 820.

Figure 9:
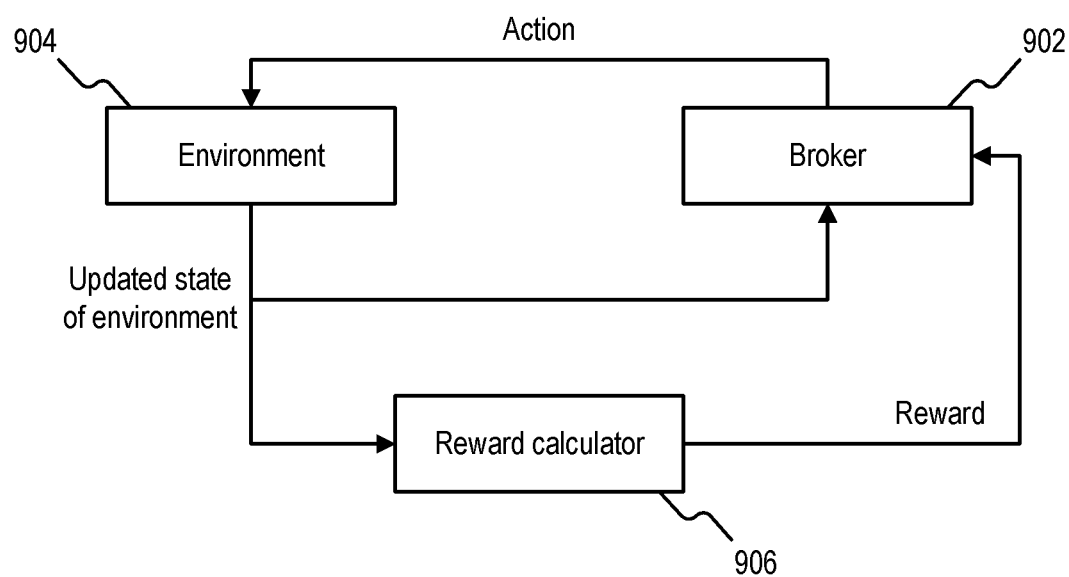
FIG. 9 illustrates a flow diagram of an exemplary training process of a controller for data traffic management in multi-source content delivery through reinforcement learning, according to an implementation of the present disclosure.

In some implementations, a reinforcement learning model is utilized. FIG. 9 illustrates an example of training process 900 with reinforcement learning. The training process 900 illustrated in FIG. 9 includes a broker 902, an environment 904, and a reward calculator 906. The broker 902 may be defined as the download process used by the controller 112. The environment 904 may be defined as one or more uniquely identified servers 102, output buffers 106, input buffers 114, and communication links 116. The reward calculator 906 determines rewards based on throughput, excess data, and the like. The reinforcement learning model defines the use of the broker 902 interacting with the environment 904. At each time step during training, the broker 902 observes an updated state of the environment 904 (e.g., a download completion time) then determines an action to perform (e.g., send download termination request to a specific server at a specific time). Upon the action being applied, the environment 904 transitions to another updated state and the broker 902 receives a reward. The broker 902 uses the reward information to improve its decisions with a goal of maximizing the expected cumulative discounted reward.

The training and processes of the controller 112 may also use global, regional, local, per-user, and per-device environment data. Environment data can be sourced from third party platforms and from the system's own data collection processes in real-time or non-real-time. This capability information that a single implementation of an optimized controller utilized globally, may be different at a regional, a local, a per-user, or a per-device basis because both server characteristics and network characteristics can vary widely within and across geographic locations. For example, the controller 112 may be configured to different solutions for clients running in San Francisco vs. clients running in Mumbai. Moreover, the model and the controller 112 can additionally factor temporal variances and access network heterogeneity during training and operation.

Implementation Mechanisms—Hardware Overview

According to one implementation, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. The techniques are not limited to any specific combination of hardware circuitry and software, nor to any particular source for the instructions executed by a computing device or data processing system.

The term "storage media" as used herein refers to any media that store data and/or instructions that cause a machine to operation in a specific fashion. It is non-transitory. Such storage media may comprise non-volatile media and/or volatile media. Non-volatile media includes, for example, optical or magnetic disks. Volatile media includes dynamic memory. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics. Transmission media can also take the form of acoustic or light waves, such as those generated during radio-wave and infra-red data communications.

Equivalents, Extensions, Alternatives, and Miscellaneous

In the foregoing specification, possible implementations of the present disclosure have been described with reference to numerous specific details that may vary from implementation to implementation. Any definitions expressly set forth herein for terms contained in the claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. It should be further understood, for clarity, that exempli gratia (e.g.) means "for the sake of example" (not exhaustive), which differs from id est (i.e.) or "that is."

Additionally, in the foregoing description, numerous specific details are set forth such as examples of specific components, devices, methods, etc., in order to provide a thorough understanding of implementations of the present disclosure. It will be apparent, however, to one skilled in the art that these specific details need not be employed to practice implementations of the present disclosure. In other instances, well-known materials or methods have not been described in detail in order to avoid unnecessarily obscuring implementations of the present disclosure.

Various aspects of the present disclosure may take any one or more of the following exemplary configurations:

EEE(1) An apparatus, comprising: a downloader coupled to a plurality of servers via a plurality of communication links; and a controller configured to determine initial download requests for the plurality of servers based on predetermined information about a quality of the plurality of communication links, send the initial download requests to the plurality of servers with the downloader, update the information about the quality of the plurality of communication links after the downloader receives data associated with a data file from the plurality of servers via the plurality of communication links, determine subsequent download requests for the plurality of servers based on the updated information about the quality of the plurality of communication links, and send the subsequent download requests to the plurality of servers via the downloader.

EEE(2) The apparatus according to EEE(1), wherein the initial download requests include one request for each of the plurality of servers.

EEE(3) The apparatus according to EEE(1) or EEE(2), wherein the initial download requests include a request for a specific server included in the plurality of servers to send a first quantity of the data to the downloader, wherein the subsequent download requests include a request for the specific server to send a second quantity of the data to the downloader, and wherein the second quantity is different than the first quantity.

EEE(4) The apparatus according to EEE(3), wherein the controller is further configured to determine an initial server load of the specific server based on the predetermined information about the quality of the plurality of communication links, determine the first quantity of the data based on the initial server load, determine an updated server load of the specific server based on the updated information about the quality of the plurality of communication links, and determine the second quantity of the data based on the updated server load.

EEE(5) The apparatus according to any one of EEE(2) to EEE(4), wherein the initial download requests include a request for a specific server included in the plurality of servers to send a quantity of the data to the downloader, wherein the subsequent download requests include a download termination request for the specific server to stop sending the data to the downloader, and wherein the controller is further configured to determine a server completion time of the specific server, and send the download termination request to the specific server before the server completion time.

EEE(6) The apparatus according to any one of EEE(1) to EEE(5), wherein the initial download requests include a request for a specific server included in the plurality of servers to set a size of an output buffer of the specific server to a first value, and wherein the subsequent download requests include a request for the specific server to set the size of the output buffer to a second value that is less than the first value.

EEE(7) The apparatus according to any one EEE(1) to EEE(6), wherein the information about the quality of the plurality of communication links includes a bandwidth and a latency.

EEE(8) A method, comprising: determining initial download requests for a plurality of servers based on predetermined information about a quality of a plurality of communication links coupling the plurality of servers to a downloader; sending the initial download requests to the plurality of servers with the downloader; receiving data associated with a data file at the downloader from the plurality of servers via the plurality of communication links; updating the information about the quality of the plurality of communication links after the downloader receives the data from the plurality of servers via the plurality of communication links; determining subsequent download requests for the plurality of servers based on the updated information about the quality of the plurality of communication links; and sending the subsequent download requests to the plurality of servers with the downloader.

EEE(9) The method according to EEE(8), wherein the initial download requests include one request for each of the plurality of servers.

EEE(10) The method according to EEE(8) or EEE(9), further comprising: detecting under-loaded servers included in the plurality of servers based on the updated information about the quality of the plurality of communication links; and sending the subsequent download requests only to the under-loaded servers included in the plurality of servers.

EEE(11) The method according to any one of EEE(8) to EEE(10), wherein the initial download requests include a request for a specific server included in the plurality of servers to send a first quantity of the data to the downloader, wherein the subsequent download requests include a request for the specific server to send a second quantity of the data to the downloader, and wherein the second quantity is different than the first quantity.

EEE(12) The method according to EEE(11), further comprising: determining an initial server load of the specific server based on the predetermined information about the quality of the plurality of communication links; determining the first quantity of the data based on the initial server load; determining an updated server load of the specific server based on the updated information about the quality of the plurality of communication links; and determining the second quantity of the data based on the updated server load.

EEE(13) The method according to EEE(11), further comprising: determining an initial load request; determining an initial download completion time based on the initial load request and the predetermined information about the quality of the plurality of communication links; determining an initial server load of the specific server based on the initial download completion time and the predetermined information about the quality of the plurality of communication links; and determining the first quantity of the data based on the initial server load.

EEE(14) The method according to EEE(13), further comprising: determining an updated download completion time based on the updated information about the quality of the plurality of communication links; determining an updated server load of the specific server based on the updated download completion time and the updated information about the quality of the plurality of communication links; and determining the second quantity of the data based on the updated server load.

EEE(15) The method according to any one of EEE(8) to EEE(14), wherein the initial download requests include a request for a specific server included in the plurality of servers to send a quantity of the data to the downloader, wherein the subsequent download requests include a download termination request for the specific server to stop sending the data to the downloader, and wherein the method further comprising: determining a server completion time of the specific server; and sending the download termination request to the specific server before the server completion time.

EEE(16) The method according to EEE(15), further comprising: determining a round trip time of the specific server; and sending the download termination request to the specific server less than one iteration of the round trip time before the server completion time.

EEE(17) The method according to any one of EEE(8) to EEE(16), wherein the initial download requests include a request for a specific server included in the plurality of servers to set a size of an output buffer of the specific server to a first value, and wherein the subsequent download requests include a request for the specific server to set the size of the output buffer to a second value that is less than the first value.

EEE(18) The method according to any EEE(17), further comprising: sending the subsequent download requests to the plurality of servers after the downloader receives a quantity of the data from the plurality of servers that is greater than a majority threshold.

EEE(19) The method according to any one of EEE(8) to EEE(18), wherein the information about the quality of the plurality of communication links includes a bandwidth and a latency.

EEE(20) A non-transitory computer-readable medium storing instructions that, when executed by an electronic processor of a computer, cause the computer to perform operations comprising the method according to any one of EEE(8) to EEE(19).

What is claimed is:

1. An apparatus, comprising:
    a downloader coupled to a plurality of servers via a plurality of communication links; and
    a controller configured to
        determine initial download requests for the plurality of servers based on predetermined information about a quality of the plurality of communication links,
        send the initial download requests to the plurality of servers with the downloader,
        update the information about the quality of the plurality of communication links after the downloader receives data associated with a data file from the plurality of servers via the plurality of communication links,
        determine subsequent download requests for the plurality of servers based on the updated information about the quality of the plurality of communication links, and
        send the subsequent download requests to the plurality of servers via the downloader,
    wherein the initial download requests include a request for a specific server included in the plurality of servers to set a size of an output buffer of the specific server to a first value,
    wherein the controller is further configured to:
        determine that the download is almost complete when the downloader has received a quantity of the data from the plurality of servers that is greater than a majority threshold; and
        if the controller determines that the download is almost complete, send subsequent download requests to the plurality of servers, wherein the subsequent download requests include a request for the specific server to set the size of the output buffer to a second value that is less than the first value.

2. The apparatus according to claim 1, wherein the initial download requests include one request for each of the plurality of servers.

3. The apparatus according to claim 1, wherein the initial download requests include a request for a specific server included in the plurality of servers to send a first quantity of the data to the downloader, wherein the subsequent download requests include a request for the specific server to send a second quantity of the data to the downloader, and wherein the second quantity is different than the first quantity.

4. The apparatus according to claim 3, wherein the controller is further configured to
    determine an initial server load of the specific server based on the predetermined information about the quality of the plurality of communication links,
    determine the first quantity of the data based on the initial server load,
    determine an updated server load of the specific server based on the updated information about the quality of the plurality of communication links, and
    determine the second quantity of the data based on the updated server load.

5. The apparatus according to claim 1, wherein the initial download requests include a request for a specific server included in the plurality of servers to send a quantity of the data to the downloader, wherein the subsequent download requests include a download termination request for the specific server to stop sending the data to the downloader, and wherein the controller is further configured to
    determine a server completion time of the specific server, and
    send the download termination request to the specific server before the server completion time.

6. The apparatus according to claim 1, wherein the information about the quality of the plurality of communication links includes a bandwidth and a latency.

7. A method, comprising:
    determining initial download requests for a plurality of servers based on predetermined information about a quality of a plurality of communication links coupling the plurality of servers to a downloader;
    sending the initial download requests to the plurality of servers with the downloader;
    receiving data associated with a data file at the downloader from the plurality of servers via the plurality of communication links;

updating the information about the quality of the plurality of communication links after the downloader receives the data from the plurality of servers via the plurality of communication links;

determining subsequent download requests for the plurality of servers based on the updated information about the quality of the plurality of communication links; and sending the subsequent download requests to the plurality of servers with the downloader, wherein the initial download requests include a request for a specific server included in the plurality of servers to set a size of an output buffer of the specific server to a first value, the method further comprising:

determining that the download is almost complete when the downloader has received a quantity of the data from the plurality of servers that is greater than a majority threshold; and if it is determined that the download is almost complete, sending subsequent download requests to the plurality of servers, wherein the subsequent download requests include a request for the specific server to set the size of the output buffer to a second value that is less than the first value.

8. The method according to claim 7, wherein the initial download requests include one request for each of the plurality of servers.

9. The method according to claim 8, further comprising:
detecting under-loaded servers included in the plurality of servers based on the updated information about the quality of the plurality of communication links; and sending the subsequent download requests only to the under-loaded servers included in the plurality of servers.

10. The method according to claim 7, wherein the initial download requests include a request for a specific server included in the plurality of servers to send a first quantity of the data to the downloader, wherein the subsequent download requests include a request for the specific server to send a second quantity of the data to the downloader, and wherein the second quantity is different than the first quantity.

11. The method according to claim 10, further comprising:
determining an initial server load of the specific server based on the predetermined information about the quality of the plurality of communication links;

determining the first quantity of the data based on the initial server load;

determining an updated server load of the specific server based on the updated information about the quality of the plurality of communication links; and determining the second quantity of the data based on the updated server load.

12. The method according to claim 10, further comprising:
determining an initial load request;

determining an initial download completion time based on the initial load request and the predetermined information about the quality of the plurality of communication links;

determining an initial server load of the specific server based on the initial download completion time and the predetermined information about the quality of the plurality of communication links; and determining the first quantity of the data based on the initial server load.

13. The method according to claim 12, further comprising:
determining an updated download completion time based on the updated information about the quality of the plurality of communication links;

determining an updated server load of the specific server based on the updated download completion time and the updated information about the quality of the plurality of communication links; and determining the second quantity of the data based on the updated server load.

14. The method according to claim 7, wherein the initial download requests include a request for a specific server included in the plurality of servers to send a quantity of the data to the downloader, wherein the subsequent download requests include a download termination request for the specific server to stop sending the data to the downloader, and wherein the method further comprising:

determining a server completion time of the specific server; and sending the download termination request to the specific server before the server completion time.

15. The method according to claim 14, further comprising:
determining a round trip time of the specific server; and sending the download termination request to the specific server less than one iteration of the round trip time before the server completion time.

16. The method according to claim 7, wherein the information about the quality of the plurality of communication links includes a bandwidth and a latency.

17. A non-transitory computer-readable medium storing instructions that, when executed by an electronic processor of a computer, cause the computer to perform operations comprising the method according to claim 7.

* * * * *

UNITED STATES PATENT AND TRADEMARK OFFICE
CERTIFICATE OF CORRECTION

PATENT NO. : 11,671,485 B2
APPLICATION NO. : 17/436480
DATED : June 6, 2023
INVENTOR(S) : Mingchao Yu et al.

It is certified that error appears in the above-identified patent and that said Letters Patent is hereby corrected as shown below:

On the Title Page

IN THE (57) ABSTRACT:
Page 2, Column 1, Line 7, Delete "The controller of" and insert --The controller is--.

Signed and Sealed this
Fifteenth Day of October, 2024

Katherine Kelly Vidal
*Director of the United States Patent and Trademark Office*